(12) United States Patent
Chopra et al.

(10) Patent No.: US 10,956,561 B2
(45) Date of Patent: Mar. 23, 2021

(54) AUTOMATIC WHITELISTING USING PROVISIONING INFORMATION

(71) Applicant: Nicira, Inc., Palo Alto, CA (US)

(72) Inventors: Amit Chopra, Sunnyvale, CA (US); Daniel G. Wing, Los Altos, CA (US); Vijay Ganti, Cupertino, CA (US); Christopher Corde, Burlingame, CA (US); Amit Patil, Pune (IN); Peixiao Lin, Santa Clara, CA (US)

(73) Assignee: Nicira, Inc., Palo Alto, CA (US)

( * ) Notice: Subject to any disclaimer, the term of this patent is extended or adjusted under 35 U.S.C. 154(b) by 212 days.

(21) Appl. No.: 16/286,765

(22) Filed: Feb. 27, 2019

(65) Prior Publication Data

US 2019/0197233 A1    Jun. 27, 2019

Related U.S. Application Data

(63) Continuation-in-part of application No. 16/112,648, filed on Aug. 25, 2018.

(60) Provisional application No. 62/550,580, filed on Aug. 26, 2017.

(51) Int. Cl.
| | | |
|---|---|---|
| *H04L 29/06* | (2006.01) | |
| *G06F 21/51* | (2013.01) | |
| *G06F 8/61* | (2018.01) | |
| *G06F 21/52* | (2013.01) | |
| *G06F 21/55* | (2013.01) | |

(52) U.S. Cl.
CPC ............... *G06F 21/51* (2013.01); *G06F 8/61* (2013.01); *G06F 21/52* (2013.01); *G06F 21/552* (2013.01); *H04L 63/1425* (2013.01)

(58) Field of Classification Search
CPC . G06F 21/552; H04L 41/046; H04L 41/0853; H04L 63/101; H04L 63/1408; H04L 63/1425; H04L 63/20
See application file for complete search history.

(56) References Cited

U.S. PATENT DOCUMENTS

2017/0235595 A1\* 8/2017 Vankadaru ............ G06F 16/951
    718/1

\* cited by examiner

*Primary Examiner* — Olugbenga O Idowu

(57) ABSTRACT

A security system for a distributed application obtains and, in effect, preserves provisioning information for the purpose of auto-populating whitelists used to protect the distributed application from intrusions. The provisioning information identifies allowable connections on a software-package level. Entries mapping processes to connection destinations are added to a whitelist if a process requesting a connection results from execution of an executable file installed as part of a software package for which the connection was allowed according to the provisioning information.

9 Claims, 3 Drawing Sheets

| SOFTWARE PACKAGE DESCRIPTION TABLE 200 | | | |
|---|---|---|---|
| PACKAGE ID 202 | HOST VM 204 | FILES 206 | CONNECTIONS 208 |
| | | | |

FIG. 2

| ALLOWABLE CONNECTION WHITELIST 168 | | |
|---|---|---|
| PROCESS ID (FILE) 302 | DESTINATION 304 | VERIFICATION 306 |
| | | |

FIG. 3

AUTOMATIC WHITELISTING USING PROVISIONING INFORMATION

BACKGROUND

Enterprise applications, especially those that are Internet-facing, are vulnerable to intrusions of increasing sophistication. Security systems often protect using blacklists, that is, lists of processes and executables known or suspected to be problematic. When a process or executable file is detected that is found on the black list, it can be stopped, quarantined, removed, etc. However, new processes/executables may cause problems before they are detected, characterized, and represented on a blacklist.

While blacklists list what should be disallowed, whitelists list what should be allowed. Accordingly, when a new problematic process is introduced, whitelists do not, in general, have to be updated. However, what should be allowed depends on what is installed. Thus, while a blacklist can be applicable to a wide variety of systems, whitelists may have to be custom-generated for each system. It is therefore desirable to generate applicable whitelists automatically.

BRIEF DESCRIPTION OF THE DRAWINGS

FIG. 2 is a schematic diagram of a software package description table of the computer system of FIG. 1.

FIG. 3 is a schematic diagram of an allowable process behavior whitelist of FIG. 1.

DETAILED DESCRIPTION

Figure 1:
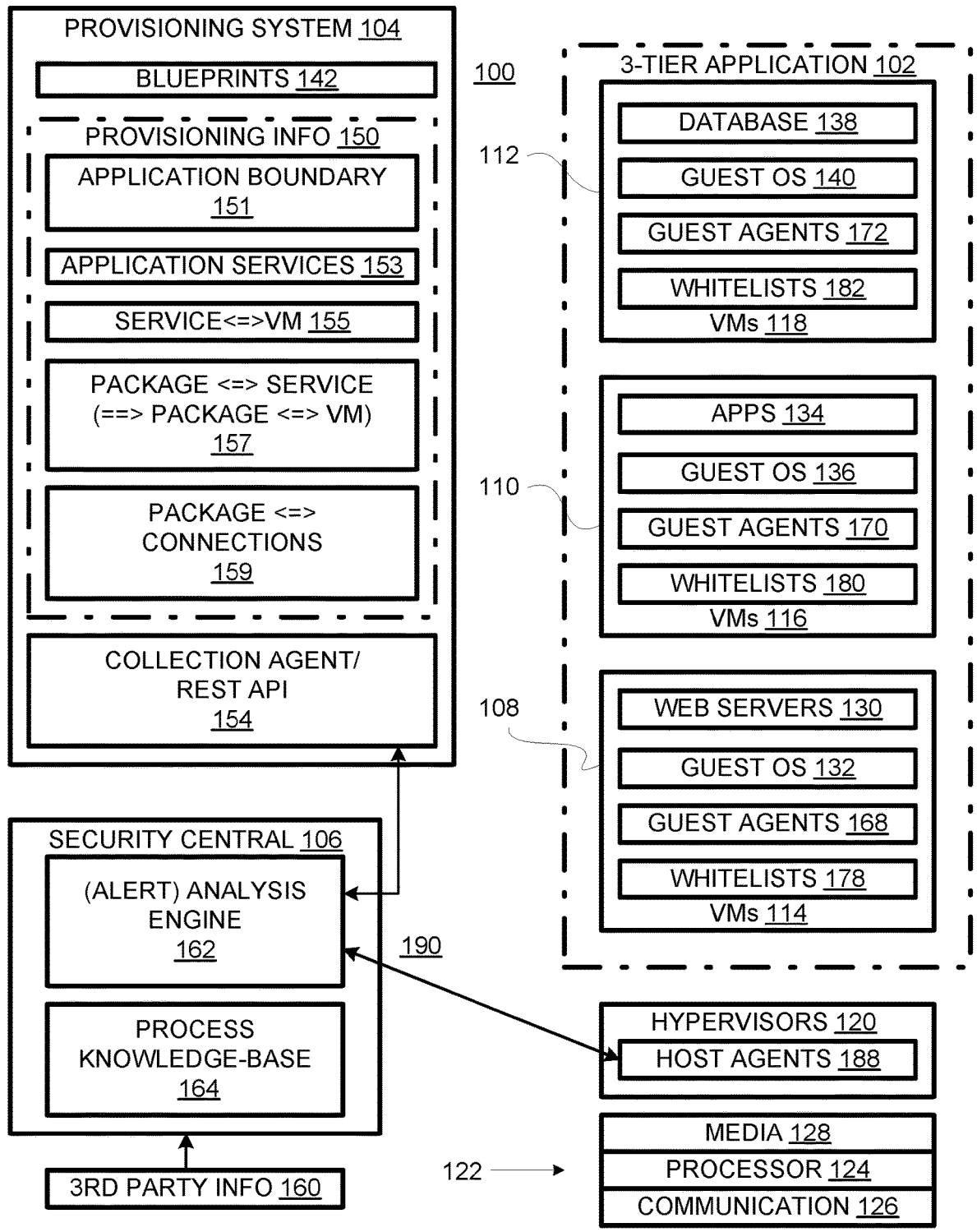
FIG. 1 is a schematic diagram of a computer system along with an enterprise application that it hosts.

The present invention provides for automatically populating process-connection whitelists for a distributed (i.e., multi-machine) application using provisioning information obtained from a provisioning system, e.g., Chef™, Puppet™, or Ansible™. It turns out that information used in provisioning a distributed application: 1) can be helpful in securing the distributed application against intrusions; but 2) is not available or is not readily discoverable from the deployed application itself.

A whitelist that only lists allowed processes may be ineffective against badly behaving processes that assume the identities of allowed processes or allowed processes that have been hijacked for unintended purposes. To address such vulnerabilities, a whitelist can list allowed connections in association with allowed processes. For example, allowed connections to other machines may be listed. If an allowed process attempts a connection to a non-whitelisted destination, the connection can be blocked and an alert can be issued.

Process behaviors are context dependent. For example, it cannot be assumed that, because a first instance of process is allowed to make a connection, a second instance of the process would be allowed to make the same connection. Thus, while diverse systems can use the same blacklist, whitelists specifying allowed connections or other behavior must, in general, be generated anew for each application context. Since standardized whitelists do not seem practical, automatic population of process connection whitelists becomes sin qua non for their practicality. Herein, provisioning information is repurposed for auto-populating process behavior whitelists.

A provisioning system is typically used for installing software on physical and virtual hosts. Some provisioning systems, e.g., vRA (vRealize Automation, available from VMware, Inc.) can be used to create virtual machines to host the software, while other provisioning systems, e.g., Chef™, Puppet™, and Ansible™, require the virtual machines or other hosts to be pre-installed, e.g., using a management product such as vCenter, available from VMware, Inc.

Provisioning can encompass installing software packages on virtual machines and setting up connections that allow certain software packages to communicate with certain of the virtual machines. However, once the desired connections have been set up, the allowed package-VM connection information used to guide the installation may be discarded. Furthermore, installing a software package typically dissociates the file in the package from the package itself, which may no longer exist on the deployed distributed application. As mentioned above, however, the present invention repurposes at least some provisioning information toward auto-populating whitelists.

More specifically, the provisioning information can be used to identify: 1) an application boundary (e.g., a sales booking application); 2) the services within an application (e.g., the sales booking application includes a web service, an app service, and a database service); 3) which virtual machines are to participate in which service; and 4) the software packages that are installed on the end services and, thus, the respective virtual machines; and 5) which connections the packages will be making and/or monitoring.

From the fact that a package is allowed to connect to a destination (e.g., a virtual machine), it may be deduced that at least one executable file in the package, when executed, implements a process that is allowed to connect to that destination. Therefore, if a process requesting a connection to a destination was a part of a package that was allowed to connect to that destination, it is relatively likely that the request should be granted. On the other hand, if a process requesting a connection to a destination was not part of any package that was allowed to connect to that destination, then it is relatively unlikely that that connection should be allowed.

Accordingly, the present invention thus preserves the allowed package-VM connection information normally available to the provisioning system and normally not available in the deployed distributed application so that it can be used as a basis for automatically populating whitelists that map processes (rather than packages) to connection destinations. Thus, each virtual machine can include a respective whitelist and a security agent that monitors connection requests. In a learning mode, the agent can auto-populate the respective whitelist with entries mapping processes (that request connections to respective destinations) to the requested destinations provided the source package (that included an executable that when executed resulted in the requesting process) was allowed to connect to that destination.

As shown in FIG. 1, a computer system 100 includes a three-tier distributed application 102, a provisioning system 104 that is used to provision application 102, and a security central 106, used to protect application 102 from problematic processes. Application 102 includes a web-server tier 108, an app tier 110, and a database tier 112. Such three-tier applications are commonplace; other embodiments provide for non-tiered applications and applications with different numbers of tiers.

Tiers 108, 110, and 112, include respective sets of virtual machines 114, 116, and 118. These virtual machines are supported by hypervisors 120, which, in turn, run on hardware 122. Hardware 122 includes processors 124, communications devices 126 (including input-output devices and network devices), and non-transitory media 128 (including main memory and mass storage). Media 128 is encoded with code defining the functionality of hypervisors 120, application 102, provisioning system 104, and security central 106. In some embodiments, application components run directly on host hardware, while other embodiments provide for a variety of virtualization arrangements.

Each virtual machine of distributed application 102 hosts one or more software programs via a respective guest operating system (OS). Virtual machines 114 of web-server tier 108 host instances of a web-server program 130 via guest operating systems 132. Virtual machines 116 of app tier 110 host app programs 134 via guest operating systems 136. Virtual machines 118 of database tier 112 host instances of a database app 138 via guest operating systems 140.

Provisioning system 104 provides for provisioning applications such as distributed application 102. Examples of provisioning systems include provisioning software such as Chef™, Puppet™, Ansible™, and vRealize Automation™. To this end, provisioning system 104 includes a catalog of blueprints 142 that serve as templates for a variety of common application scenarios. Other embodiments have other sources of information required for provisioning an application.

Regardless of the form it takes, the provisioning information 150 can be used to identify: 1) an application boundary 151 (e.g., a sales booking application); 2) the services 153 within an application (e.g., the sales booking application includes a web service, an app service, and a database service); 3) mappings 155 of application services to their hosts (e.g., virtual machines); 4) mappings 157 of the software packages to the services they support; and 5) mappings 159 of software packages to allowed connections.

Security central 106 imports and analyzes the provisioning system. In some embodiments, the information can be imported via Restful State Application Programming Interfaces (REST APIs). In other embodiments, a collection agent, e.g., a plug-in, can be installed in the provisioning system to collect the provisioning information and transmit it to security central 106. The imported provisioning information can be supplemented using information 160 from other, e.g., third-party sources. For example, software-package vendors may provide listings of files included in respective software packages. Security central 162 includes an analysis engine 162 that can analyze the provisioning information and supplemental information to assembly process information 164, e.g., a knowledgebase regarding processes to be run in the context of distributed application 102. Analysis engine 160 is also used to analyze alerts issued when a connection requested by a process is disallowed, e.g., because the requested connection is not represented in a whitelist.

Ultimately, deployment engine 144 provides a deployment plan 150 to be implemented to effect the desired deployment or modification. Deployment plan 148 includes the specifications for the application including characterizations of the virtual machines, software packages to be installed on the virtual machines, and the virtual-machines to which each software package is allowed to connect (e.g., for configuring firewalls). For each software package, the information shown in the software package descriptions table 200 of FIG. 2 is specified: a name or other identifier 202 for the package, the virtual machine 204 to host the package, the files 206 in the package (including executable files that, when executed, yield processes), and the allowed connections 208 for the package. The correspondences between files and connections are not typically specified.

Security central 106 includes an analysis engine 150 for analyzing alerts and other information. To this end, security central 106 maintains a knowledge base 152 of information about processes including those expected to be running in application 102. The knowledgebase is initially populated with third-party information 154 which includes information from software vendors regarding the contents of the software packages installed in deploying and modifying application 102. For example, process knowledgebase can include a software-package description table 200, shown in FIG. 2, that maps each package identity 202 to the its host 204, to the files 206 it contains, and to the connections 208 it is allowed to make. In addition, the knowledgebase 152 can include information resulting from analyses of alerts.

Security central 106 is, in effect, the organizing entity for a security system 190 that includes a collection agent, if such an agent (plug-in) is installed in provisioning system 104. In addition, security system includes guest agents installed in respective hosts, e.g., virtual machines, of distributed application 102. More specifically, security system 190 includes guest agents, e.g., agents 168, 170, and 172 respectively installed in virtual machines 114, 116, and 118 of application tiers 108, 110, and 112. Guest agents monitor app processes, detect when they request connections (e.g., to other virtual machines), decide whether to allow the connections based at least in part on co-resident whitelists 178, 180, and 182. As shown in FIG. 3, an allowable-connection whitelist 168 maps process identifiers 302 to one or more connection destinations 304 and a verification type or source 306. Other whitelists of distributed application 102 100 (FIG. 1) provide corresponding information.

In the event a whitelist fails to indicate a given process is allowed to make the connection it is requesting, the guest agent issues an alert to a respective host agent 188 running on the hypervisor that also supports the virtual machine from which the alert is used. Host agents 188 collect and bundle alerts from its resident virtual machines. This reduces network traffic, especially in scenarios where many alert are issued concurrently, e.g., during a denial of service attack.

Figure 4:
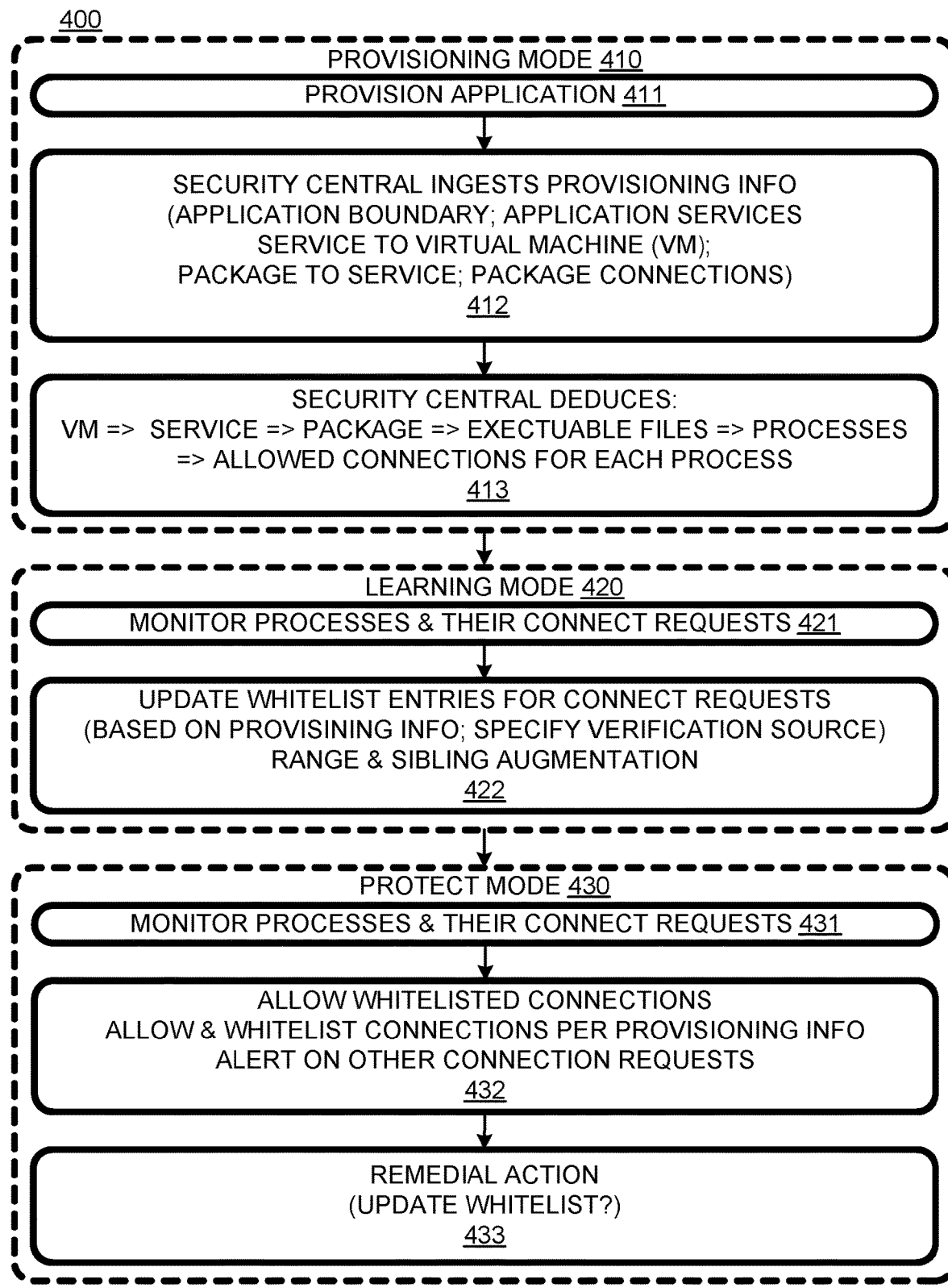
FIG. 4 is a flow chart of a process for automatically populating whitelists of the enterprise application of FIG. 1.

A security process 400, implementable in computer system 100 and other systems, is flow charted in FIG. 4. Security process 400 includes three modes, provisioning 410, learning 420, and protect 430. Although these modes area shown in a particular order for expository purposes, it should be noted that provisioning can occur at any time, e.g., to modify a previously provisioned application. Provisioning can occur during learning mode and/or protect mode. Furthermore, learning mode can be activated at any time, as can protect mode. In some embodiments, learning and protection are combined into a single mode, so that learning and protection do not corresponds to distinct modes of operation.

In provisioning mode 410, at 411, a distributed application is provisioned so as to create or modify the application. The provisioning can include installing software packages on physical or virtual machines. In the case of virtual-machine hosts, these may be created by the provisioning system (e.g., in the case of vRealize Automation™, or may be created prior to provisioning (as typical for Chef™, Puppet™, and Ansible™.

At 412, security central ingests provisioning information. As listed above, the provisioning information can identify an application boundary, application services, hosts for application services, software packages for implementing application services, and allows package connections. At 413, security central uses the provisioning information (along with 3' party information) to deduce which connections can be allowed for which processes. Basically, a process is allowed to connect to a destination if the package that contained the executable for the process is allowed to make the connection. In some embodiments, all such allowed connections are whitelisted. However, this would result in a whitelist with many entries that would never be requested. Accordingly, whitelist entries are entered automatically in response to actual connection requests.

During learning mode 420, processes and their connect requests are monitored, as indicated at 421. The connection may be for the purpose of transmitting messages or for listening for messages or both. At 422, whitelist entries are made in response to connection requests. As shown in FIG. 3, entries map process identifiers 302 to connection destinations 304 and to verification sources and types 306. In an event in which a requesting process was part of a package allowed to make the requested connection, then "provisioning information" can be indicated as the verification source. Other entries may be indicated as "well-known" or "administrator-identified". If there is no verification source, then a "verification needed" can be listed as the verification type. In other words, during learning mode, all connection requests are "learnt", but some require additional verification (or repudiation).

Not all allowed connection destinations result from requests for those destinations. An administrator can simply add entries manually. "Range augmentation" involves including non-requested destinations in a whitelist that are in ranges that include other destinations that were requested. "Sibling augmentation" involves adding entries to a local whitelist that are copies of entries made to another whitelist, e.g., where two hosts are provisioned with separate instances of the same software package. Application boundary information is used to preclude copying entries from separate instances of the same software package providing services for different distributed applications.

In the illustrated embodiment, learning also occurs in protect mode 430, which represents normal (vulnerable) operation. The functional difference between protect mode 430 and learning mode 420 is that connection requests that cannot be verified are disallowed and trigger alerts. Guest agents monitor processes and their connection requests at 431. At 432, connection requests that can be verified as allowable are allowed; if they are not already represented in the respective whitelist, they can be added. For disallowed connection requests, alerts are sent to security central via host agent. At 433, security central may take some automated remedial action and/or inform an administrator of the disallowance so that the administrator can initiate some action. One possible outcome of an alert is that the whitelist is updated so that the connection can be allowed in the future.

Herein, all art labelled "prior art", if any, is admitted prior art; all art not labelled "prior art", if any, is not admitted prior art. The illustrated embodiments, variations thereupon, and modifications thereto are provided for by the present invention, the scope of which is defined by the following claims.

What is claimed is:

1. A security process comprising:
    obtaining from a provisioning system provisioning information used to deploy or modify a distributed application by installing software packages on respective hosts of a target system, the provisioning information specifying software packages installed on each host of the target system;
auto-populating allowed-connection whitelists of respective hosts of the target system with entries mapping processes to connections determined to be allowable based, at least in part, on the provisioning information, wherein the auto-populating includes:
    detecting a process request by a first instance of a first process for a connection to a first destination, the first instance of the first process running on a first host;
    identifying a respective software package that includes an executable that was launched to instantiate the first process; and
    in an event in which it is determined that the requested connection is allowed for the respective software package according to the provisioning information,
        including a first entry in a first whitelist mapping the first instance of the first process with the first destination; and
    including a second entry is a second whitelist mapping a second instance of the first process to the first destination, the second instance running on a second host different from the first host; and
    determining whether to allow or disallow a connection request based, at least in part, one the presence or absence of a matching entry in a respective one of the allowed-connection whitelists.

2. The security process of claim 1 wherein the auto-populating includes:
    detecting a process request for a connection;
    identifying a respective software package that includes an executable that was launched to instantiate the process making the request; and
    in an event in which it is determined that the requested connection is allowed for the respective software package according to the provisioning information, including an entry in the respective whitelist mapping the requesting process with the requested connection.

3. The security process of claim 1 wherein the auto-populating includes:
    detecting a process request for a connection;
    identifying a respective software package that includes an executable that was launched to instantiate the process making the request; and
    in an event in which it is determined that the requested connection is one of a range of connections allowed for the respective software package according to the provisioning information, including an entry in the respective whitelist mapping the requesting process with the range of connections.

4. The security process of claim 1 wherein the hosts are virtual machines and the provisioning systems includes provisioning software selected from a set consisting of Chef™, Puppet™, Ansible™, and vRealize Automation™.

5. A security system comprising non-transitory media encoded with code that, when executed by a processor, implements a process including:
    obtaining from a provisioning system provisioning information used to deploy or modify a distributed application by installing software packages on respective hosts of a target system, the provisioning information specifying software packages installed on each host of the target system;

auto-populating allowed-connection whitelists of respective hosts of the target system with entries mapping processes to connections determined to be allowable based, at least in part, on the provisioning information, wherein the auto-populating includes:

detecting a process request by a first instance of a first process for a connection to a first destination, the first instance of the first process running on a first host;

identifying a respective software package that includes an executable that was launched to instantiate the first process; and in an event in which it is determined that the requested connection is allowed for the respective software package according to the provisioning information,
      including a first entry in a first whitelist mapping the first instance of the first process with the first destination; and including a second entry is a second whitelist mapping a second instance of the first process to the first destination, the second instance running on a second host different from the first host; and determining whether to allow or disallow a connection request based, at least in part, one the presence or absence of a matching entry in a respective one of the allowed-connection whitelists.

6. The security system of claim 5 wherein the auto-populating includes:

detecting a process request for a connection;

identifying a respective software package that includes an executable that was launched to instantiate the process making the request; and in an event in which it is determined that the requested connection is allowed for the respective software package according to the provisioning information, including an entry in the respective whitelist mapping the requesting process with the requested connection.

7. The security system of claim 6 wherein the auto-populating includes:

detecting a process request for a connection;

identifying a respective software package that includes an executable that was launched to instantiate the process making the request; and in an event in which it is determined that the requested connection is one of a range of connections allowed for the respective software package according to the provisioning information, including an entry in the respective whitelist mapping the requesting process with the range of connections.

8. The security process of claim 6 wherein the hosts are virtual machines and the provisioning systems includes provisioning software selected from a set consisting of Chef™, Puppet™, Ansible™, and vRealize Automation™.

9. The security system of claim 6 further comprising the processor.

* * * * *